United States Patent [19]

Feeney et al.

[11] 4,288,567

[45] Sep. 8, 1981

[54] ADHESIVE COMPOSITION AND METHOD OF PREPARATION

[75] Inventors: George W. Feeney, Akron; William G. Stevenson, Uniontown, both of Ohio

[73] Assignee: The Goodyear Tire & Rubber Company, Akron, Ohio

[21] Appl. No.: 70,379

[22] Filed: Aug. 27, 1979

[51] Int. Cl.³ .............................................. C08L 53/02
[52] U.S. Cl. ...................................... 525/99; 525/97; 525/98
[58] Field of Search .............................. 525/97, 98, 99

[56] References Cited

U.S. PATENT DOCUMENTS 4,172,860 10/1979 Feeney et al. ..................... 525/314

Primary Examiner—J. Ziegler
Attorney, Agent, or Firm—H. C. Young, Jr.

[57] ABSTRACT

Adhesive composition comprised of an unvulcanized block polymer product and a compatible tackifier resin. Said adhesive composition is required to be prepared by (A) mixing a solution of a block styrene/isoprene polymer product with a solution of a tackifying resin and (B) optionally removing the solvent.

12 Claims, No Drawings

ADHESIVE COMPOSITION AND METHOD OF PREPARATION

FIELD OF INVENTION

This invention relates to adhesive compositions and method of preparation. The invention has particular reference to pressure sensitive adhesives of both the solution cast and the hot melt application types.

BACKGROUND OF INVENTION

Various adhesives can individually be advantageously used as pressure sensitive, laminate or hot melt adhesives. Most are generally known for their ability to form articles by bonding laminates together. Some are more particularly known as pressure sensitive adhesives and some as hot melt adhesives.

Pressure sensitive adhesives and adhesive-coated masking tapes and the like are well known. These products commonly contain a mixture of natural rubber or styrene/isoprene/styrene block polymer and a thermoplastic tackifier resin compatible therewith. The adhesive, coated on a flexible backing to form a tape, is tacky at normal room temperatures and adheres instantly and tightly to surfaces against which it is pressed without requiring moistening or heating. It typically is required to have a balance of good shear strength, a satisfactory 180° peel strength, and good tack property in order to be commercially useful.

Adhesives are many times based on mixtures of rubbery materials and tackifiers. Pressure-sensitive adhesives typically require more sophisticated properties than simple tackified rubber compositions. They must have especially balanced properties of adhesion, cohesion and elasticity in addition to peel and shear strengths to be useful for adhering materials together on a pressure-sensitive basis.

Many times, pressure-sensitive adhesives can be based on mixtures of tackifiers with natural rubber or with block copolymers of isoprene and styrene. However, such adhesive composites are often deficient in desirable properties.

It is, therefore, an object of this invention to provide an adhesive composition of a tackifier and a rubbery block polymer product of styrene and isoprene.

DISCLOSURE AND PRACTICE OF INVENTION

In accordance with this invention, an adhesive composition has been discovered which is comprised of an admixture of an unvulcanized block polymer product and a compatible tackifier resin therefor prepared by the method which comprises (A) mixing (1) 100 parts by weight of a solution comprised of 100 parts by weight of an unvulcanized block styrene/isoprene polymer product with an overall styrene polymer content in the range of about 10 to 35 weight percent and a solvent therefor in the range of about 300 to about 1100, preferably about 400 to about 1000, parts by weight with (2) about 50 to about 200, preferably about 100 to about 150, parts by weight of a solution comprised of 100 parts by weight of a tackifying resin for said block polymer product and a solvent therefor in the range of about 25 to about 1100, preferably about 100 to about 1000, parts by weight and (B) optionally removing said solvent from the prepared mixture prior to its application as an adhesive; wherein the total of said solvent(s) is a solvent for the combination of said block polymer and said resin; wherein said block polymer is (i) produced by the process of contacing isoprene and a suitable amount of divinylbenzene under solution polymerization conditions with a polystyryllithium catalyst, said amount of divinylbenzene being from about 0.5/1 to about 10/1, preferably about 0.5/1 to about 3/1, moles of divinylbenzene per mole of active lithium catalyst or is (ii) of the linear or radial type styrene/isoprene/styrene block copolymer prepared by sequentially polymerizing styrene and isoprene with a lithium based initiator and wherein said resin has a softening point in the range of about 50° C. to about 170° C., preferably about 70° C. to about 115° C.

The (B) option of removing the solvent before application would be used for hot melt adhesive applications. For solution adhesive applications, solvent could be retained or the mixture dried and redissolved prior to application.

It is an important feature of this invention that the adhesive composition can be prepared by directly mixing the polymerizates of either or both the block polymer product composed of (A-1) and/or the resin polymerizate composed of (A-2).

Thus, the adhesive composition can be formed by a method selected from (A) mixing the block polymer polymerizate with a solution of the solid resin dissolved in its solvent, (B) mixing a solution of the solid block polymer product dissolved in its solvent with a solution of the solid resin dissolved in its solvent, (C) mixing a solution of the solid block polymer dissolved in its solvent with the resin polymerizate or (D) mixing the block polymer polymerizate with the resin polymerizate.

The term polymerizate is intended to refer to a solution of the block polymer product or resin as a direct result of its preparation or polymerization, of its precursor monomers in the presence of its solvent and catalyst, deactivated and optionally removed.

The terms solid block polymer product and solid resin refer to such materials in their recovered form from the polymerizates. When they are dissolved in their solvent they become a solution. It is readily recognized that this solution-forming procedure from the solid product requires an additional step and effort as compared to the utility and/or convenience of directly using the polymerizate.

In the practice of this invention, the blending or mixing process can be generally accomplished, for example, by using a turbine blade agitation system for a period of about three hours at about 20° C. to 30° C.

The adhesive composition can conveniently be recovered, for example, by application of conventional steam stripping and drying procedures, such as oven drying, to remove solvent.

It was unexpectedly found that by using the solution preparation process of this invention, a resulting adhesive composition was observed having increased tack, faster molten solution time and excellent tack retention of the hot melt blend properties as compared to simply dry blending the block polymer product and tackifying resin.

A disclosure of such dry blending can be found in U.S. Pat. No. 4,172,860 filed Oct. 2, 1978, which is incorporated herein by reference.

In order to effectively provide a solution of the resultant adhesive composition by the method of this invention, it is readily understood that solvents or solvent mixtures are selected in which the block polymer product and the resin are mutually soluble. For example, the block polymer product is generally soluble in aromatic hydrocarbons such as toluene and benzene as well as some cycloaliphatic hydrocarbons such as cyclohexane, cyclopentane and methylcyclopentane. Tackifying resins are also usually soluble in such solvents with some being soluble in aliphatic hydrocarbons and chlorinated aliphatic hydrocarbons. Mixtures of solvents can be used with solubility advantages tailored to both the block polymer and resin. It is generally preferred that the solvent or solvent mixture of the resulting mixed solutions contain about 80 to about 100 weight aliphatic hydrocarbon solvent based on the solvent(s) alone. Thus, the choice of solvent or solvent mixture must depend upon the type of resin used as well as the block polymer product which can readily be determined by one having skill in the art. The term hydrocarbon solvent is intended to refer to liquid hydrocarbons and liquid halo-substituted hydrocarbons.

In the practice of this invention, said tackifier is a resin preferably having a softening point in the range of about 50° C. to about 150° C., preferably about 70° C. to about 115° C., and is preferably selected from at least one of terpene resins and synthetic hydrocarbon derived resins of diolefin/olefin copolymers. Coumeroneindene type resins may be satisfactory. The diolefin/olefin copolymers are generally of the type prepared by copolymerizing in the presence of a catalyst selected from aluminum chloride or boron trifluoride or boron trifluoride etherate, a mixture of piperylene and at least one olefin containing 4 to 6, preferably 5 to 6, carbon atoms in a diolefin/olefin mole ratio in the range of about 0.6/1 to about 2.5/1, preferably about 0.8/1 to about 1.6/1. Optionally, said copolymer can be modified by copolymerizing therewith about 5 to about 20 weight percent, based on the total monomers, of at least one additional monomer selected from α-methylstyrene and dicyclopentadiene. Some of such resins can have melting points according to ASTM E28-58T less than the required range. However, lower softening resins can be conveniently mixed with higher softening point resins to achieve the required range.

A particularly desirable type of tackifying resin is prepared from piperylene and 2-methyl-2-butene in about 0.8/1 to about a 1.6/1 mole ratio, with the optional inclusion of α-methylstyrene and/or dicyclopentadiene. Aluminum chloride would be a preferred catalyst.

In the further practice of this invention, the unvulcanized elastomeric block copolymer (i) preferably has its first polystyrene block with a molecular weight in the range of about 8,000 to about 45,000 with the overall styrene content in the copolymer being in the range of about 10 to about 35 weight percent, preferably 10 to 20 percent.

Additional description of a required block copolymer (i) for this invention and methods for its preparation are found in U.S. Pat. No. 3,949,020 and it is herein incorporated by reference.

In the block copolymer (i), the molecular weight of the polystyrene block and the molecular weight of the polydiolefin block can range quite broadly. Also, the weight ratio between the polystyrene and the polydiolefin can range quite broadly. The polystyrene block molecular weight can range from about 8,000 to about 45,000. The polydiolefin block molecular weight, ignoring the effect of the divinylbenzene (DVB), can range from about 10,000 to about 100,000. It should be understood that one skilled in the art could adjust these molecular weight limitations and ratios to produce a host of materials ranging from soft, relatively weak (tensile at break 500 psi) adhesive substrates, through tough thermoplastic elastomeric, to plastics. Because these materials are branched, they are more easily processed than their linear counterparts.

The polystyryllithium catalysts useful in the preparation of the block copolymer are those that correspond to the formula RLi, in which R is polystyrene prepared by reacting alkyllithium with a styrene monomer solution forming polystyrene with a lithium atom at one end of the styrene chain. The alkyllithiums which can be utilized in the instant invention are n-butyllithium, secondary butyllithium, isopropyllithium, amyllithium, etc. Similarly, substituted styrenes such as p-methylstyrene, p-t-butylstyrene, or other substituted styrenes may be used in place of styrene, although for this invention, generally only styrene is preferred. For instance, if a styrene-isoprene block polymer branched along the polymer chain of the polyisoprene block to other styrene-isoprene units is to be prepared, the n-butyllithium is reacted with a styrene solution to make a polystyryl lithium catalyst which can then be added to an isoprene solution containing the branching agent and polymerizing the isoprene solution until the desired block polymer is formed.

The polymerization reaction is usually carried out in an inert solvent such as a hydrocarbon. It has been found however that all hydrocarbons will not be particularly conducive. Some hydrocarbons that can be utilized for preparing the copolymer are benzene, toluene, cyclohexane, cyclopentane and methyl cyclopentane.

The unvulcanized elastomeric block copolymer (ii) of the linear or radial type which can be used in this invention comprises nonelastomeric terminal styrene polymer blocks having a molecular weight in the range of about 5000 to about 30,000 and internal elastomeric isoprene polymer blocks having a molecular weight in the range of about 50,000 to about 150,000, where the styrene polymer block(s) is about 10 to about 30 weight percent of the copolymer. The characteristics of the internal or middle block, which is elastomeric, might be expressed in ASTM Special Technical Bulletin No. 184 as follows: "A substance that can be stretched at room temperature to at least twice its original length and, after having been stretched and the stress removed, returns with force to approximately its original length in a short time."

The terminal nonelastomeric blocks constitute polymeric blocks which do not meet this definition. Furthermore, the difference between glass transition temperatures of the end blocks and middle blocks should be at least 40° C. and preferably at least 100° C.

Typically, the unvulcanized elastomeric copolymers (i) can be prepared by first polymerizing styrene with a lithium based initiator. A suitable lithium based initiator is, for example, lithium metal, alkyl lithium compounds, lithium hydrocarbyls and organo lithium amides. The alkyl lithium compounds are preferred. Particularly preferred alkyl lithium compounds are branched chain, preferably secondary alkyl lithiums. Such alkyl lithium compounds especially include secondary butyl lithium, isobutyl lithium, isoamyl lithium and secondary amyl lithium.

After polymerizing the styrene to an average molecular weight of from about 2000 to about 100,000, and preferably from about 5000 to about 30,000, isoprene and additional amounts of styrene are added to the polymerization mixture.

The polymerization then continues to provide an elastomeric middle block isoprene polymer having an average molecular weight of from about 25,000 to about 1,000,000, and more preferably between about 50,000 and about 500,000, followed by a non-elastomeric styrene block polymer to provide the block copolymer effect.

Typically, the preparation of the elastomeric block copolymer is made by polymerizing the monomers at temperatures in the order of about −20° C. to about 100° C., preferably between about 20° C. and about 65° C. in an inert hydrocarbon solvent such as an alpha olefin or aromatic hydrocarbon. Typically inert hydrocarbon solvents are aliphatic hydrocarbons (including cycloaliphatic) such as cyclohexane and a typical aromatic hydrocarbon is benzene. Usually the amount of initiator should be maintained as low as possible, but may be varied over a relatively wide range such as from about 1 to about 200 parts per million, based on the weight of the monomers present.

In the practice of this invention, the adhesive composition is useful for bonding substrates together. Although utility as a solution cast adhesive can be shown, the adhesive composition prepared by this invention has been found to particularly provide an enhanced usefulness in hot melt adhesive applications. Apparently the solution mixing as a method of preparation is an important factor.

The adhesive composition of this invention can suitably bond substrates together such as by simply applying it as a hot melt to substrate surfaces and adhering the surfaces together with a thin film of the mixture therebetween. Alternately, it can be applied in its solution form. The mixture solution is applied to at least one of the substrate surfaces, followed by at least partially drying it to enhance its tack, bringing the substrate surfaces together with the application of pressure and drying the adhesive to enhance the bond.

Pressure-sensitive tapes can be prepared by applying a solution of the adhesive composition to a flexible substrate and drying it.

The composition, as a hot melt pressure sensitive adhesive, can be prepared by mixing the block copolymer, tackifying resin, and thermoplastic polymer such as polyethylene, polyisobutylene, polystyrene, poly-α-methylstyrene, ethylene-vinyl acetate copolymers and a minor amount of an oil such as petroleum-derived or coal tar-derived oil such as mineral oil or rubber processing oil. The hot melt adhesive is applied by heating the mixture, applying it to a substrate and cooling.

In the preparation of the adhesives of this invention it is understood that minor amounts of various antioxidant and fillers can be mixed therewith.

The following examples further illustrate the invention and are not intended to be limiting. The parts and percentages are by weight unless otherwise indicated.

EXAMPLE I

A resin is prepared as follows:

To a reactor is charged 200 parts of heptane and 6 parts of anhydrous aluminum chloride at a temperature of about 25° C. While stirring the mixture, 400 parts of a hydrocarbon mixture containing unsaturated hydrocarbons is slowly added to the reactor over a period of about 90 minutes. The temperature of the reaction is maintained at about 25° C. to 30° C. for about 60 minutes. The hydrocarbon mixture has the following composition:

| Component | Parts |
|---|---|
| 2-pentene | 5.3 |
| 2-methyl-1-butene | 2.3 |
| 2-methyl-2-butene | 37.5 |
| Isoprene | 0.2 |
| 1,3-pentadiene (piperylene) | 45.0 |
| Cyclopentene | 7.5 |
| Unsaturated hydrocarbons containing 5 to 6 carbon atoms | 2.3 |
| | 100.1 |

After the polymerization, 25 parts of water, 8 parts of particulate hydrated calcium hydroxide and 8 parts of Attapulgus clay are added to the polymerizate. Agitation is provided to suspend the hydrated calcium hydroxide at about 90° C. and continued for about 120 minutes. The mixture is then filtered to remove the insoluble catalyst residue, excess calcium compound and clay. The filtrate is then steam distilled to a pot temperature of about 235° C. The resulting molten resin is poured from the reactor onto an aluminum tray and cooled to about 25° C. to form 173 parts of a hard brittle resin having a pale yellow color, and having a softening point, according to ASTM Method E28-58T of about 98° C., although it has been observed that softening points in the range of about 95° C. to about 101° C. are generally obtained.

EXAMPLE II

A styrene/isoprene block copolymer is generally prepared according to the method of Example II of U.S. Pat. No. 3,949,020.

EXAMPLE III

Adhesives were prepared by solution masterbatch according to this invention and by individual blending and compared. The tackifying resin was prepared generally according to Example I and the styrene/isoprene block polymer product was prepared according to the general method referred to as Example II.

In the practice of this invention, it is preferable that the polystyrene block has a molecular weight in the range of about 10,000 to about 25,000, based on number average, for hot melt applications.

The solution masterbatch was prepared by blending the unvulcanized block polymer dissolved in solvent with the tackifier dissolved in solvent using a turbine blade agitator at about 25° C. The masterbatch was mixed for 3 hours and the adhesive composition recovered in a conventional stripping and drying manner. The adhesive composition was oven dried at a temperature of about 50° C. for about 6 hours.

The adhesive composition was applied as a pressure sensitive adhesive by mixing with additional toluene while agitating to form a 33.3 weight percent solution. The solution was cast on one mil thickness film of Mylar (a trademark of the E. I. DuPont de Nemours & Co. for a polyester film) which was pulled between two steel rolls at a steady rate which were positioned at approximately a 30° vertical angle to each other for a doctoring effect for the coating. The coated film was oven dried for about 5 minutes at about 70° C. to form a one mil thickness dry coating on the film.

The same adhesive composition could be applied as a hot melt by first drying to remove solvent and then heating the mass to about 190° C.–205° C., coating the Mylar film therewith and doctoring by pulling the coated film through the rolls which would be heated to about 190° C.–210° C. Thus, the one mil adhesive film coating can be deposited and formed in this manner without the use of solvent.

The individual blending of an adhesive composition was accomplished by sequentially mixing toluene with the block polymer product, then the tackifying resin and then a small amount of antioxidant to form a solution.

The solution of the individually blended mixture was applied as a pressure sensitive adhesive by coating it on a one mil Mylar film and doctored by pulling through two rollers which were at approximately a 30° vertical angle to each other at a steady rate. The sheet of coated film was oven dried for about 5 minutes at about 70° C. to form a one mil thickness dry film coating.

Comparative data of the two types of pressure sensitive adhesive compositions is shown in the following Tables 1 and 2. Table 1 relates to the compositions and Table 2 relates to data pertaining to the compositions. The compositions are identified herein as experiments, or compositions, A–D. Experiment D represents the invention utilizing the mixing of individual solutions of block copolymer and tackifying resin followed by drying the solution mixture. The dried composition was redissolved in toluene and dried to yield the adhesive. The block copolymer was used directly in its polymerizate form where cyclohexane had been used as the polymerization solvent. The tacifying resin had been previously recovered and dried from its polymerizate followed by redissolving it in cyclohexane.

Composition A–C were prepared by simply mixing toluene with the dried block polymer, adding the dried resin thereto to form a solution and then drying the solution mixture.

TABLE 1

| Adhesive Compositions | A | B | C | D |
|---|---|---|---|---|
| styrene/isoprene/styrene block copolymer[1] | 56 | — | — | — |
| styrene/isoprene/styrene block copolymer[2] | — | 56 | — | — |
| styrene/isoprene block copolymer with DVB[3] | — | — | 56 | — |
| styrene/isoprene block copolymer mixed with tackifying resin[4] | — | — | — | 100 |
| Tackifying resin[5] | 44 | 44 | 44 | — |
| Phenolic antioxidant | 1 | 1 | 1 | 1 |
| Toluene | 200 | 200 | 200 | 200 |

[1]Obtained as Kraton 1107, a product of the Shell Chemical Co., reportedly containing 14% styrene end blocks
[2]Obtained as Solprene 423-P, a product of the Phillips Petroleum Co., reportedly containing 15% styrene end blocks
[3]Prepared generally according to Example II
[4]Tackifying resin was prepared according to Example I. Block copolymer was prepared by method of Example II. The resin was recovered and dried from its polymerizate, then solution mixed with the block polymer polymerizate in its cyclohexane solvent in a copolymer/resin ratio of 56/44 and then dried.
[5]Prepared according to method of Example I.

TABLE 2

| Adhesive Composition Data | A | B | C | D |
|---|---|---|---|---|
| Brookfield Viscosity (cps) | | | | |
| (Spindle No. 2 @20 rpm) | 840 | 1105 | 510 | 500 |
| Rolling Ball Tack (In.) | | | | |
| Initial | 2.4 | 2.9 | 2.2 | 1.9 |
| Aged[1] | 2.6 | 3.1 | 2.4 | 1.6 |

TABLE 2-continued

| Adhesive Composition Data | A | B | C | D |
|---|---|---|---|---|
| 180° Peel Adhesion (Oz.) | | | | |
| Initial | 53 | 55 | 51 | 48 |
| Aged[1] | 54 | 54 | 53 | 48 |
| 90° Peel Adhesion (Oz.) | | | | |
| Initial | 38 | 38 | 38 | 35 |
| Aged[1] | 36 | 35 | 38 | 33 |
| Dynamic Shear (psi) | | | | |
| Initial | 43 | 46 | 44 | 41 |
| Aged[1] | 38 | 39 | 39 | 37 |
| Temperature to Failure (°F.) | | | | |
| 1000 G/1 sq. in. | 249 | 252 | 202 | 199 |
| Solution Appearance | Light Straw | Cloudy[2] | Light Amber | Light Amber |

Film Appearance
Initial ←— Off White —→
Aged[1] ←— Off White —→

UV Exposure - 96 hrs ←— Very slight discoloration —→

Light Source - 14-½ inches
Surface Temperature 92° F.

| Exposed Film Tack[3] (DAYS) | | | | |
|---|---|---|---|---|
| 3 | 1 | 1 | 1 | 1 |
| 12 | 2 | 3 | 2 | 1 |
| 23 | 1 | 2 | 2 | 1 |
| 30 | 1 | VL | VL | 2 |

[1]Oven aged for 7 days at 70° C.
[2]Probably caused by a partitioning agent
[3]Number "1" is most observed tack, and "VL" is very little observed tack. The observation is a relative value on the day observed.

EXAMPLE IV

Hot melt pressure sensitive adhesives were prepared by compounding the block copolymers used for the adhesive compositions of A–C of Example III. The dry, mixed copolymer/resin of Compound D of Example III shows the invention. The recipe using the block polymers and Composition D of Example III are shown in Table 3 and identified as AA and DD, respectively.

To prepare the hot melt from block polymers, additional resins, rubber processing oil and zinc dibutyl dithiocarbamate were mixed and the mixture brought to a molten solution. The block polymer was then added.

The hot melt from Compound DD was similarly prepared except that an additional 5 parts of the block polymer product according to Example II and 90 parts of Compound D described in Example III were mixed together.

The recipes are shown in the following Table 3.

TABLE 3

| HOT MELT PRESSURE SENSITIVE ADHESIVES | AA | DD |
|---|---|---|
| Tackifying resin[1] | 80 | 40 |
| Coumarone-Indene resin; 155° C.[2] | 25 | 25 |
| Naphthenic petroleum oil | 40 | 40 |
| Zinc dibutyl dithiocarbamate | 3 | 3 |
| Block copolymer of A, B or C from Example III | 55 | — |
| Block polymer product of Example II | — | 5 |
| Dried Compound D from Example III | — | 90 |

[1]According to Example I
[2]Ring and Ball softening point

The hot melt solution times are shown in the following Table 4. These times are particularly important because it shows that by prior solution masterbatching the block polymer and tackifying resin, the molten solution time is reduced. Long molten solution compounds are generally undesirable and typically increase preparation of hot melt costs. The molten solution time is the span of time between the addition of the first in ingredient in the recipe of this example until the mixture was a smooth, workable mass.

TABLE 4

| | Hot Melt Solution Time | |
|---|---|---|
| Compound[1] | Experiment | Time to Molten Solution (minutes)[2] |
| A | AA | 70 |
| B | AA | 67 |
| C | AA | 40 |
| D | DD | 36 |

[1]Compounds from Example III.
[2]Pot temperature about 175-190° C.

While certain representative embodiments and details have been shown for the purpose of illustrating the invention, it will be apparent to those skilled in this art that various changes and modifications may be made therein without departing from the spirit or scope of the invention.

We claim:

1. An adhesive composition which comprises an admixture of an unvulcanized block polymer product and a compatible tackifier resin therefor prepared by the method which comprises (A) mixing (1) 100 parts by weight of a solution polymerizate comprised of 100 parts by weight of an unvulcanized block styrene/isoprene polymer product with an overall styrene polymer content in the range of about 10 to 35 weight percent and its polymerization solvent in the range of about 300 to about 1100 parts by weight with (2) about 50 to about 200 parts by weight of a solution polymerizate comprised of 100 parts by weight of a tackifying resin for said block polymer product and its polymerization solvent in the range of about 25 to about 1100 parts by weight and (B) removing said solvent from the prepared mixture prior to its application as an adhesive; wherein the total of said polymerization solvents is a solvent for the combination of said block polymer and said resin; wherein said block polymer polymerizate is produced by the process of contacting isoprene and a suitable amount of divinylbenzene under solution polymerization conditions with a polystyryllithium catalyst, said amount of divinylbenzene being from about 0.5/1 to about 10/1 moles of divinylbenzene per mole of active lithium catalyst; and wherein said tackifier resin polymerizate is prepared by copolymerizing in the presence of a catalyst selected from the group consisting of aluminum chloride, boron trifluoride and boron trifluoride etherate, a mixture of piperylene and at least one olefin containing 4-6 carbon atoms in a diolefin/olefin more ratio in the range of about 0.6/1 to about 2.5/1, optionally modified by copolymerizing about 5 to about 20 weight percent, based on the total monomers, of at least one additional monomer selected from α-methyl styrene and di-cyclopentadiene in which the resin itself has a softening point in the range of about 50° C. to about 150° C.

2. The adhesive composition of claim 1 wherein said block polymer product, said styrene polymer block has a molecular weight in the range of about 8,000 to about 45,000, said isoprene polymer blocks have a molecular weight in the range of about 50,000 to about 150,000 and where the difference between glass transition temperatures of the end styrene polymer blocks and isoprene polymer blocks is at least 40° C.

3. The adhesive composition of claim 1 with its solvent removed, charcterized by having a reduced hot melt solution time as compared to similar composition prepared by dry blending its block polymer and resin components.

4. The adhesive composition of claim 2 where the solvent for the block polymer product is used in an amount of about 400 to about 1000 parts by weight, where the solvent for said tackifying resin is used in an amount of about 100 to about 1000 parts by weight, where the relative amount of divinylbenzene used is about 0.5/1 to about 3/1 moles per mole active lithium catalyst and where said resin has a softening point in the range of about 70° C. to about 100° C.

5. The adhesive composition of claim 2 where said polymerization solvents is selected from at least one of toluene, benzene, cyclohexane, cyclopentane and methylcyclopentane.

6. A method of preparing an adhesive composition which comprises (A) mixing (1) 100 parts by weight of a solution polymerizate comprised of 100 parts by weight of an unvulcanized block styrene/isoprene polymer product with molecular weight in the range of 8,000 to 45,000 and overall styrene polymer weight in the range of about 10 to 35 weight percent and its polymerization solvent in the range of about 300 to about 1100 parts by weight with (2) about 50 to about 200 parts by weight of a solution polymerizate comprised of 100 parts by weight of a tackifying resin for said block polymer product and its polymerization solvent in the range of about 25 to about 1100 parts by weight and (B) removing said solvent from the prepared mixture prior to its application as an adhesive; wherein the total of said polymerization solvents is a solvent for the combination of said block polymer and said resin; wherein said block polymer polymerizate is produced by the process of contacting isoprene and a suitable amount of divinylbenzene under solution polymerization conditions with a polystyryllithium catalyst, said amount of divinly benzene being from about 0.5/1 to about 10/1 moles of divinyl benzene per mole of active lithium catalyst and wherein said resin has a softening point in the range of about 50° C. to about 120° C.; and wherein said tackifier resin polymerixate is prepared by copolymerizing in the presence of a catalyst selected from the group consisting of aluminum chloride, boron trifluoride and boron trifluoride etherate, a mixture of piperylene and at least one olefin containing 4-6 carbon atoms in a diolefin/olefin mole ratio in the range of about 0.6/1 to about 2.5/1, optionally modified by copolymerizing about 5 to 20 weight percent, based on the total monomers of at least one additional monomer selected from α-methyl styrene and di-cyclopentadiene in which the resin itself has a softening point in the range of about 50° C. to about 150° C.

7. The method of claim 6 where said block polymer product, said styrene polymer block has a molecular weight in the range of about 8,000 to about 45,000, said isoprene polymer blocks have a molecular weight in the range of about 50,000 to about 150,000 and where the difference between glass transition temperatures of the end styrene polymer blocks and isoprene polymer blocks is at least 40° C.

8. The method of claim 7 where the solvent for the block polymer product is used in an amount of about 400 to about 1000 parts by weight, where the solvent for said tackifying resin is used in an amount of about 100 to about 1000 parts by weight, where the relative amount of divinylbenzene used is about 0.5/1 to about 3/1 moles per mole active lithium catalyst and where said resin has a softening point in the range of about 70° C. to about 100° C.

9. The method of claim 7 where said solvent or solvent mixture contains about 80 to about 100 weight percent aliphatic solvent.

10. The method of claim 6 where said polymerization solvents is selected from at least one of toluene, benzene, cyclohexane, cyclopentane and methylcyclopentane.

11. The adhesive composition according to claim 1 where said resin polymerizate is prepared by copolymerizing a mixture of piperylene and 2,2-butene in about an 0.8/1 to about a 1.6/1 mole ratio, with the optional inclusion of at least one monomer selected from the group consisting of α-methyl styrene and dicyclopentadiene in the presence of aluminum chloiride as a catalyst.

12. The adhesive composition according to claim 6 where said resin polymerizate is prepared by copolymerizing a mixture of piperylene and 2,2-butene in about an 0.8/1 to about a 1.6/1 mole ratio, with the optional inclusion of at least one monomer selected from the group consisting of α-methyl styrene and dicyclopentadiene in the presence of aluminum chloride as a catalyst.

* * * * *